(No Model.)
C. FOEHL & C. A. WEEKS.
BASE PIN AND CYLINDER BRAKE FOR REVOLVERS.
No. 444,823. Patented Jan. 20, 1891.
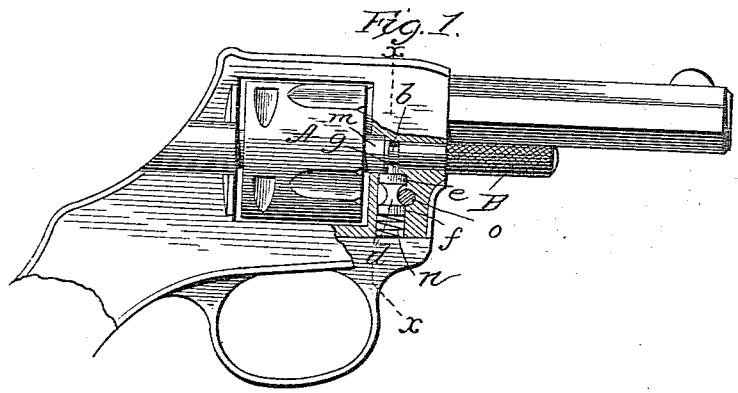
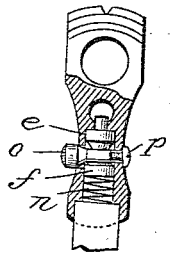
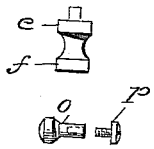
Attest
Walter Donaldson
F. L. Middleton
Inventors
Chas. Foehl
Chas. A. Weeks
by Elliot Spear Atty.

UNITED STATES PATENT OFFICE.

CHARLES FOEHL AND CHARLES A. WEEKS, OF PHILADELPHIA, PENNSYLVANIA, ASSIGNORS TO THE FOEHL & WEEKS FIRE ARMS MANUFACTURING COMPANY, OF SAME PLACE.

BASE-PIN AND CYLINDER-BRAKE FOR REVOLVERS.

SPECIFICATION forming part of Letters Patent No. 444,823, dated January 20, 1891.

Application filed April 10, 1890. Serial No. 347,357. (No model.)

*To all whom it may concern:*

Be it known that we, CHARLES FOEHL and CHARLES A. WEEKS, of Philadelphia, in the county of Philadelphia and State of Pennsylvania, have invented a new and useful Improvement in Fire-Arms; and we do hereby declare that the following is a full, clear, and exact description of the same.

The improvement referred to in the foregoing petition relates to mechanism for locking the base-pin and applying the brake to the cylinder. In this invention a single piece bears upon the cylinder and also holds the base-pin in its place. In connection with this piece is a collar upon the cylinder against which the piece bears.

The object of the invention is to simplify the construction and secure at the same time perfect action of the parts.

Our invention is shown in the accompanying drawings, in which—

Figure 1 represents the pistol in side elevation with a part of the wall of the frame broken away to show the mechanism within. Fig. 2 shows a transverse section on line $x$ $x$ of Fig. 1. Fig. 3 shows details of construction.

In the drawings, A represents the cylinder of the pistol, and B the base-pin. About the base-pin, and at the point indicated by $b$ in Fig. 1, is a circumferential groove, the base-pin being in that figure represented in its normal position. Directly underneath this groove and in the frame of the pistol is a bolt $d$. This bolt has a collar or flange at each end, marked, respectively, $e$ $f$. Projecting outside of the upper collar is a stud $g$, which projects into the circumferential groove $b$ and holds the base-pin B in its normal position. Upon the forward end of the cylinder A is a central annular flange $m$, through which the axle-hole of the cylinder extends. This annular flange projects over the upper face of the collar $e$, and the parts are so adjusted that this face may bear upon the side of the collar without permitting the end of the stud to reach the bottom of the groove. Underneath the bolt $d$ is a spring $n$, which presses the bolt normally upward, so that it bears against the side of the annular flange sufficiently to steady the cylinder when it is turned and prevent it from moving too far. The central part of the bolt is cut away, as shown in Fig. 1, to receive a transverse pin $o$. (Shown separate in Fig. 3 and in place in Fig. 2.) This pin is provided with a head and shank and an inclined shoulder between the head and shank. A screw $p$, fitted to a hole tapped in the end of the pin, holds it in place. When this push-pin is in position, as shown in Fig. 1, its inclined shoulder bears against the collar on the lower end of the bolt, so that when the pin is pushed in from the left of Fig. 2 it draws down the bolt and withdraws the stud from the groove in the base-pin. The spring $n$ is a coiled spring set in the bottom of the hole in which the bolt is located. It serves both to push the bolt upward and through the inclination on the push-pin, which is in contact to restore the push-pin to its normal position, so that no other spring is needed for the pin.

We claim as our invention—

1. In combination with the cylinder of a pistol, an annular flange $m$ on the forward end thereof, and a spring-bolt bearing against the side of the flange, all substantially as described.

2. In combination with the cylinder and its annular flange, the bolt having a part bearing upon the annular flange, and a stud projecting into a groove in the base-pin, all substantially as described.

3. In combination with the base-pin having a groove, the bolt $d$, having a stud fitted to the groove, a spring underneath the bolt, and a transverse push-pin having an inclined part fitted to the bolt, substantially as described.

In testimony whereof we have signed our names to this specification in the presence of two subscribing witnesses.

CHARLES FOEHL.
CHAS. A. WEEKS.

Witnesses:
JOHN PIERCEY,
JACOB S. DUVALL.